United States Patent [19]

Sakata

[11] Patent Number: 5,002,369
[45] Date of Patent: Mar. 26, 1991

[54] NONLINEAR OPTICAL ELEMENT HAVING ELECTRODES ON TWO SIDE SURFACES OF NONLINEAR MEDIUM THROUGH INSULATING LAYERS

[75] Inventor: Hajime Sakata, Hiratsuka, Japan

[73] Assignee: Canon Kabushiki Kaisha, Tokyo, Japan

[21] Appl. No.: 292,537

[22] Filed: Dec. 30, 1988

[30] Foreign Application Priority Data

Jan. 11, 1988 [JP] Japan .................................. 63-003543
Jan. 11, 1988 [JP] Japan .................................. 63-003544

[51] Int. Cl.$^5$ ........................... G02B 5/23; G02F 1/01; G02F 1/07
[52] U.S. Cl. .................................. 350/354; 350/355; 350/356
[58] Field of Search ......................... 350/354, 355, 356

[56] References Cited

U.S. PATENT DOCUMENTS

| | | | |
|---|---|---|---|
| 4,113,533 | 9/1978 | Okumura et al. | 437/186 X |
| 4,729,640 | 3/1988 | Sakata | 350/348 |
| 4,767,196 | 8/1988 | Jewell | 350/354 |
| 4,790,634 | 12/1988 | Miller | 350/354 X |
| 4,900,134 | 2/1990 | Inoue et al. | 350/354 |
| 4,926,177 | 5/1990 | Sakata | 341/137 |

FOREIGN PATENT DOCUMENTS 0012439 6/1980 European Pat. Off. ............ 350/355
2114768 8/1983 United Kingdom ............... 350/355

OTHER PUBLICATIONS

IEEE Journal of Quantum Electronics, vol. QE-21, No. 9, Sep. 1985, pp. 1453-1457, Jager et al.
IEEE Spectrum, vol. 18, No. 6, Jun. 1981, pp. 26-33, Smith et al.

*Primary Examiner*—Eugene R. Laroche
*Assistant Examiner*—Michael Shingleton
*Attorney, Agent, or Firm*—Fitzpatrick, Cella,, Harper & Scinto

[57] ABSTRACT

A nonlinear optical element comprises a nonlinear medium having photoconductivity and an electrooptical effect, a pair of electrodes, arranged on two side surfaces of said nonlinear medium, for applying an electric field to the medium, for serving as reflection mirrors forming an optical resonator, and a pair of insulating layers formed between the nonlinear medium and the electrodes. A predetermined DC voltage is supplied to the electrodes, and the nonlinear medium is irradiated with a light having a variable intensity. Thus, the reflectance and transmittance of the optical element is nonlinearly varied in accordance with the intensity of the incident light. Also disclosed is a method for activating such a nonlinear optical element.

15 Claims, 14 Drawing Sheets

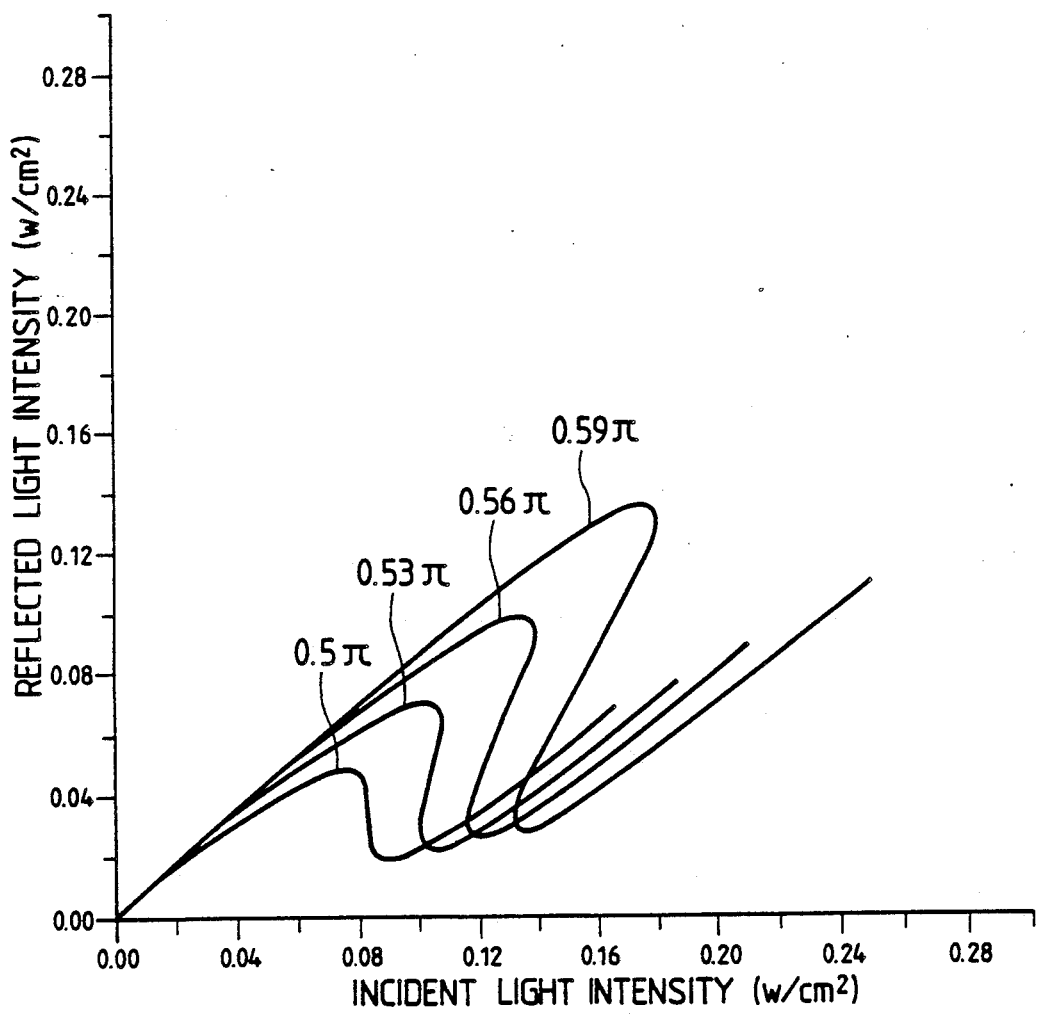

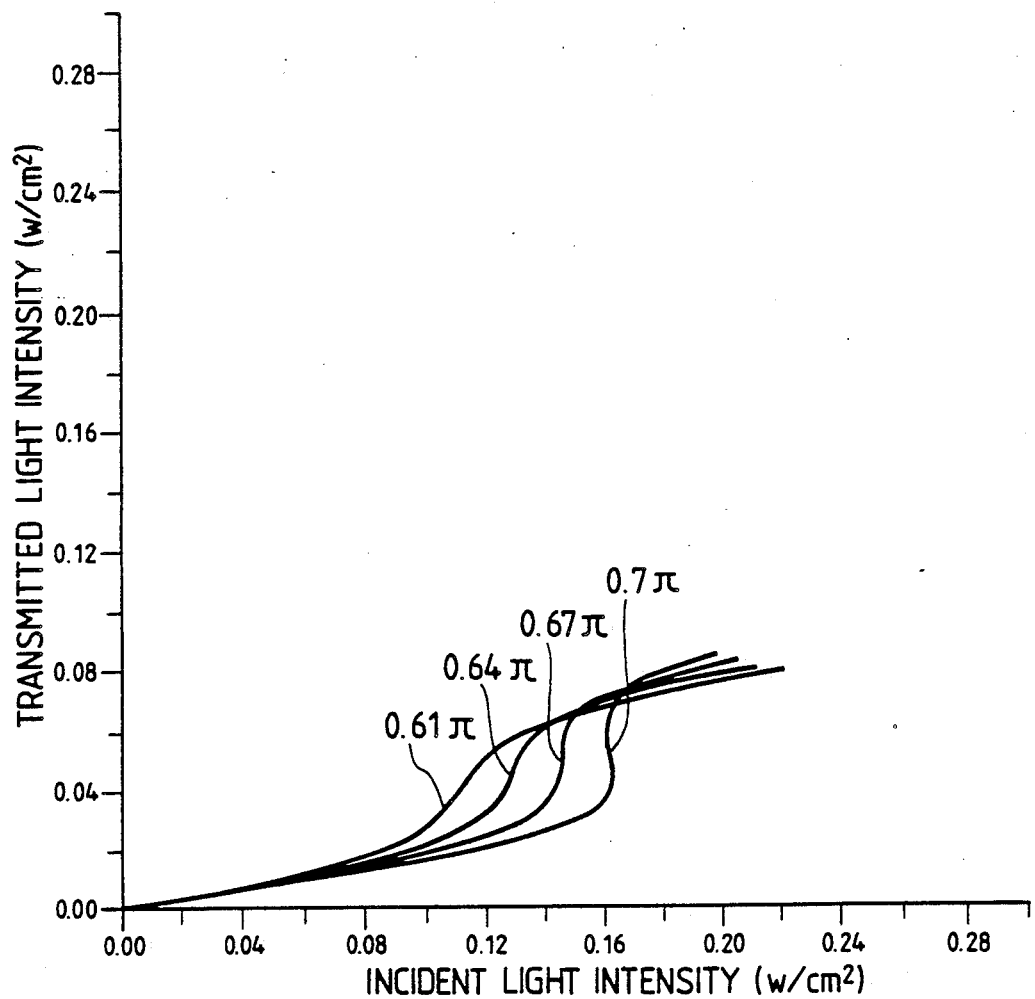

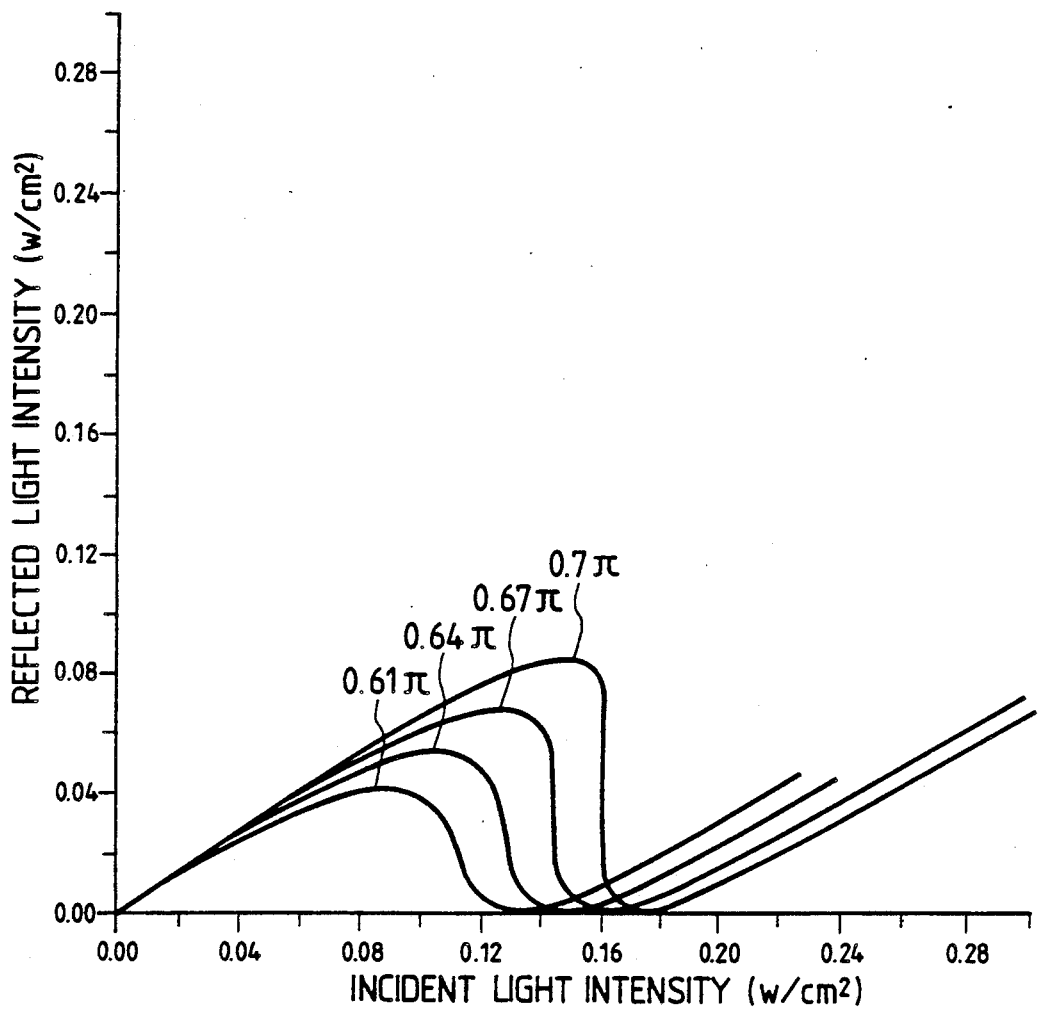

NONLINEAR OPTICAL ELEMENT HAVING ELECTRODES ON TWO SIDE SURFACES OF NONLINEAR MEDIUM THROUGH INSULATING LAYERS

BACKGROUND OF THE INVENTION

1. Field of the Invention

The present invention relates to a nonlinear optical element and, more particularly, to a nonlinear optical element suitably used for an optical functional element such as an optical modulator, an optical memory, an optical switch, an optical amplifier, an optical threshold value element, an optical logic operation in various fields, e.g., an optical computer, optical communication and the like, utilizing light as an information medium.

2. Description of the Related Art

Various conventional nonlinear optical elements (in general, also called an optical bistable element) as an element producing two different optical output stable states with respect to an identical light input intensity have been proposed.

FIG. 1 is a schematic view of a conventional nonlinear optical element. In FIG. 1, a nonlinear medium 21 exhibits one or both of absorption nonlinearity and dispersion nonlinearity with respect to an incident light intensity. Reflection mirrors 22 and 23 having a predetermined transmittance constitute an optical resonator including the nonlinear medium 21.

In the nonlinear optical element shown in FIG. 1, when incident light is incident from one side in the nonlinear medium 21 through the reflection mirror 22, the incident light is absorbed or dispersed by the nonlinear medium 21 and then reaches the reflection mirror 23. In this case, some light components of the incident light are transmitted, and the remaining components are reflected by the mirror 23 to be returned to the nonlinear medium 21.

In this case, when parameters such as a phase difference of light components upon reciprocal movement in the optical resonator, the reflectances of the reflection mirrors, and the like are properly selected, nonlinearity appears in light input/output characteristics.

For example, as shown in FIG. 2, when an incident light intensity $I_0$ to the nonlinear optical element is gradually increased from 0 and exceeds a given level, a transmitted light intensity $I_t$ is immediately increased. Such characteristics are normally called differential gain characteristics.

Depending on setting of the parameters, so-called hysteresis characteristics are obtained such that different characteristics are obtained when the incident light intensity $I_0$ is increased and decreased, as shown in FIG. 3. Note that the hysteresis characteristics are also called nonoptical bistable characteristics.

The nonlinear optical element having the characteristics described above can be widely applied to functional elements such as a memory, switch, amplification, logic operation, optical control, and the like using light as a medium.

The operation mechanism of the nonlinear medium can be largely classified into the following two mechanisms. In one operation mechanism, an electron level is changed upon incidence of light, and a refractive index or absorption coefficient is changed. In the other operation mechanism, heat is produced upon incidence of light, and a refractive index or absorption coefficient is changed. As compared to a medium utilizing an electron effect, a medium utilizing a thermal effect tends to be operated with low power but has a low operation speed and poor stability.

Contrary to this, the medium utilizing the electron effect can perform a high-speed operation but requires high operation power. In addition, since the medium utilizing the electron effect has small changes in refractive index or absorption coefficient, a margin of the nonlinear operation is small.

Normally, most nonlinear optical elements having an arrangement in which the nonlinear medium is included in the optical resonator, and optical feedback is achieved by utilizing the reflection mirrors of the optical resonator require high operation power, thus posing the most serious problem.

For example, even ZnSe or GaAs/GaAlAs which can perform an optical bistable operation at room temperature with relatively low power requires a power density of several hundreds of $W/cm^2$ or more.

If the operation power is high, the stability of the nonlinear optical element is impaired, and diffusion in the lateral direction due to generation of thermally excited electrons frequently occurs. For example, an element resolution during parallel processing of two-dimensional information is impaired, a relaxation time is prolonged, and an element operation cycle is lowered. Furthermore, when an element is operated in cooperation with another element with low operation power, the operation power of the other element must also be attenuated, resulting in various problems, such as energy loss, heat generation in the entire system, and the like.

SUMMARY OF THE INVENTION

It is an object of the present invention to provide a nonlinear optical element which can solve the problems of the related art, and can be satisfactorily operated with low power and with a simple structure.

The above object of the present invention can be achieved by a nonlinear optical element in which electrodes are arranged on two side surfaces of a nonlinear medium through insulating layers. Each electrode is formed of a metal film so as to serve as a reflection mirror constituting an optical resonator. Each insulating film may be formed of a dielectric multilayered film to serve as a reflection mirror.

BRIEF DESCRIPTION OF THE DRAWINGS

FIGS. 17 and 18 are graphs for explaining input/output characteristics of a fourth embodiment of a nonlinear optical element of the present invention; and FIGS. 19 and 20 are graphs for explaining input/output characteristics of a fifth embodiment of a nonlinear optical element of the present invention.

DETAILED DESCRIPTION OF THE PREFERRED EMBODIMENTS

Figure 1:
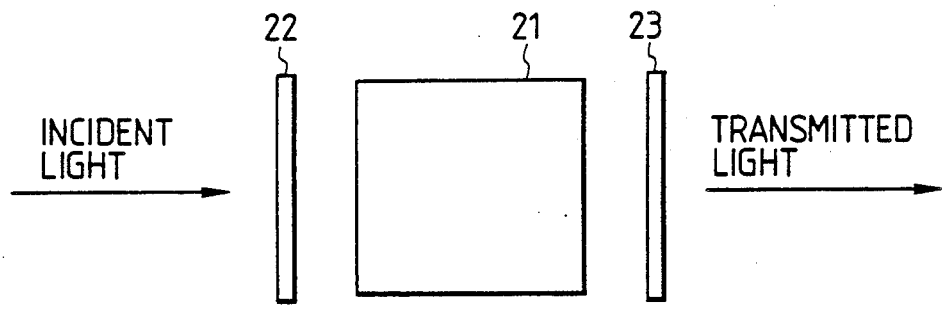
FIG. 1 is a schematic view of a conventional nonlinear optical element.
Figure 2:
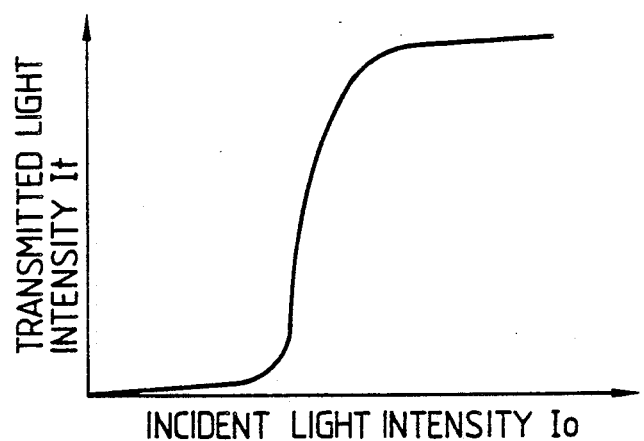
FIGS. 2 and 3 are graphs showing input/output characteristics of the conventional nonlinear optical element.
Figure 3:
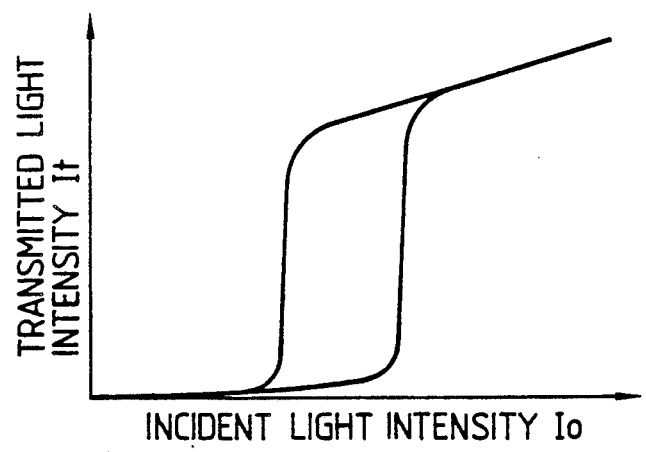
Figure 4:
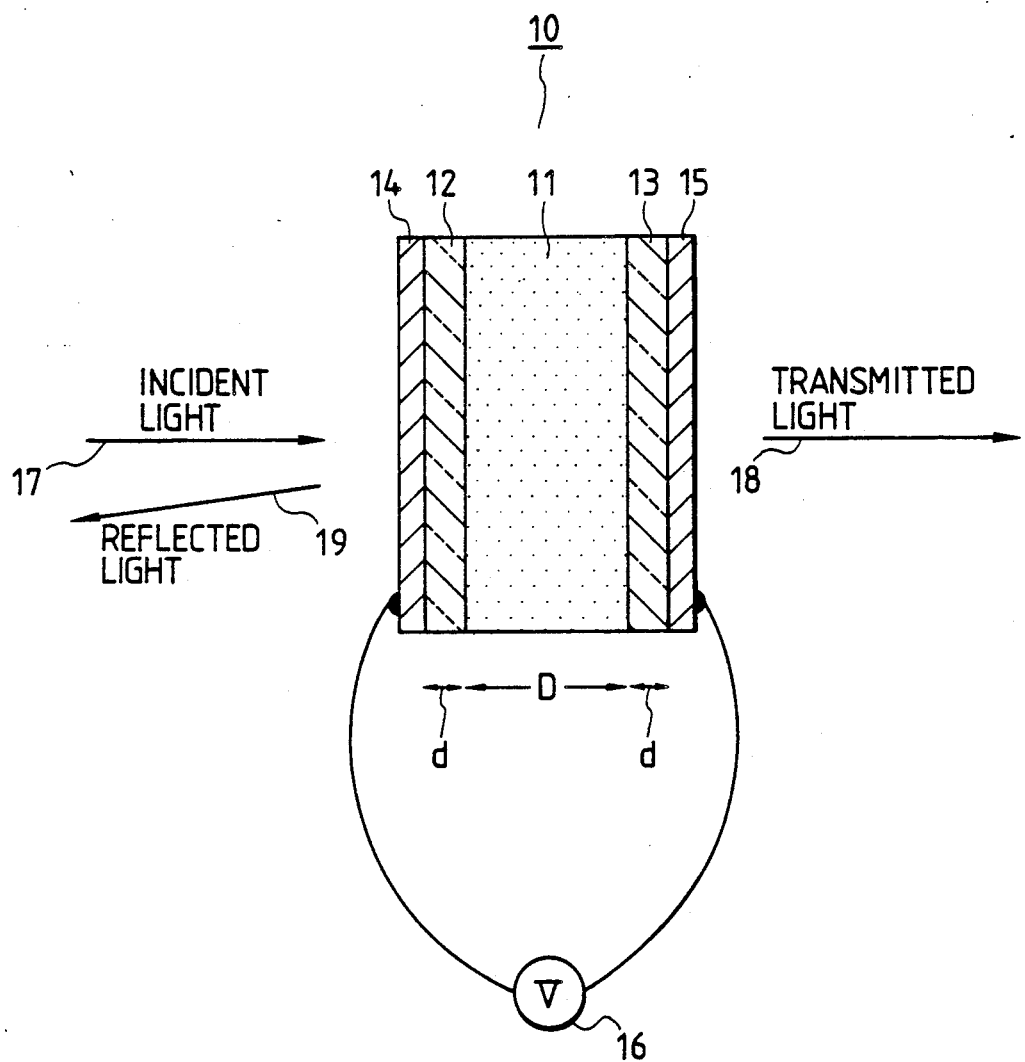
FIG. 4 is a schematic view of an example of a nonlinear optical element according to the present invention.

FIG. 4 is a schematic view of an example of the present invention. In FIG. 4, a nonlinear optical element 10 comprises a nonlinear medium 11 having photoconductivity and an electrooptical effect, and insulating films 12 and 13 arranged at two sides of the nonlinear medium. Reflection mirrors 14 and 15 having a predetermined transmittance constitute an optical resonator, and also serve as electrodes. An external power source 16 is connected to the reflection mirrors 14 and 15.

In this example, output intensities of transmitted light 18 and reflected light 19 have differential gain or hysteresis characteristics with respect to an input intensity of incident light 17.

Deriving processes of the operation mechanisms of the nonlinear optical element 10 according to this embodiment will be explained below in the following two processes:

(a) a change in refractive index of the nonlinear medium 11 depending on the intensity of the incident light 17, and a change in the amount of phase delay when light reciprocally propagates in the optical resonator; and (b) incident light intensity-output light intensity (transmitted and reflected light intensities) characteristics influenced by the change in the amount of phase delay.

The operation analysis model of the nonlinear optical element in the process (a) will be explained below with reference to FIG. 4.

As the nonlinear medium 11 having a thickness D, an electrooptical crystal having large photoconductivity and electrooptical coefficient is used. Examples of such electrooptical crystals include BSO ($Bi_{12}SiO_{20}$), BTO($Bi_{12}TiO_{20}$), BGO($Bi_{12}GeO_{20}$), $BaTiO_3$, SBN{$(Ba,Sr)Nb_2O_6$}, GaAs, ZnSe, CdTe, $LiNbO_3$, and the like (the medium 11 is also referred to as the electrooptical crystal hereinafter).

The electrooptical crystal 11 is sandwiched between the insulating films 12 and 13 each having a thickness d. The reflection mirrors 14 and 15 forming the optical resonator are arranged outside the insulating films 12 and 13. The reflection mirrors are formed of a metal, and also serve as electrodes. As a material constituting the reflection mirrors 14 and 15, Al (for the entire visible region), Ag (for the entire visible region and an infrared region), Au and Cu (for the infrared region), and the like are preferable.

Figure 5:
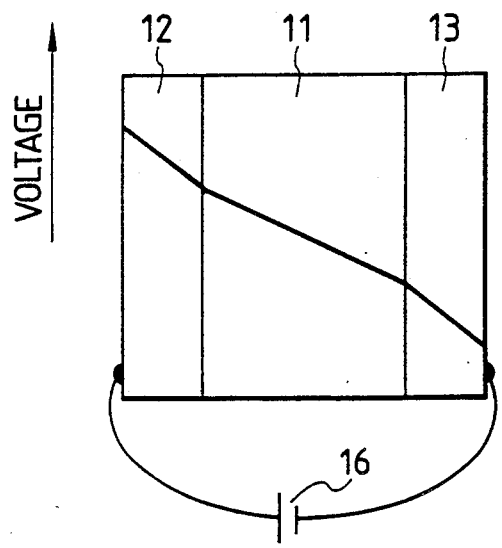
FIGS. 5 to 8 are views for explaining the operation principle of the nonlinear optical element of the present invention.

FIG. 5 illustrates a state of an electric field applied to the electrooptical crystal 11 and the insulating films 12 and 13 upon application of a voltage from the external power source 16 in FIG. 4. FIG. 5 illustrates a state wherein no light is incident. In this case, the external electric field is directly applied to the electrooptical crystal 11.

Figure 6:
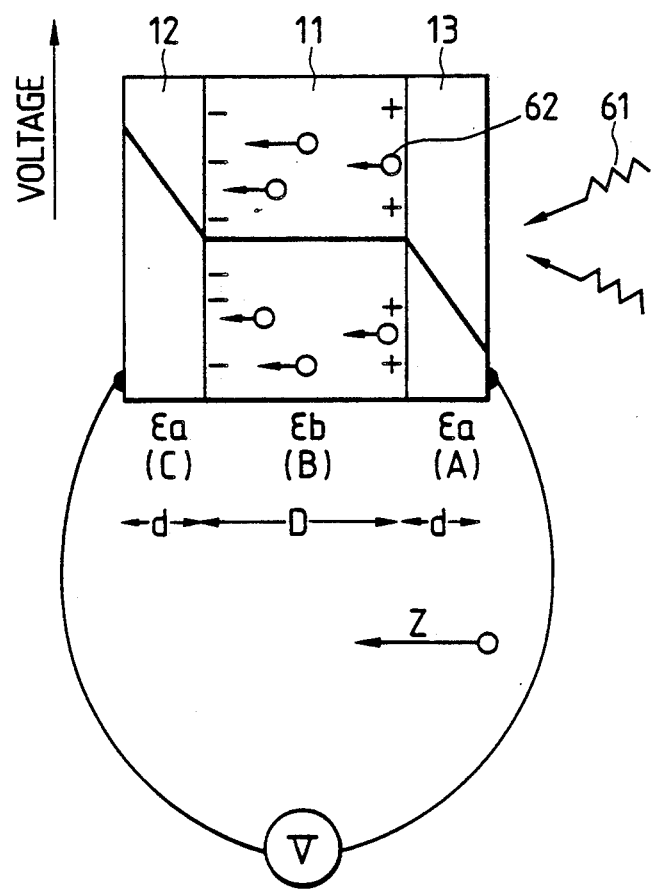

When incident light 61 becomes incident, as shown in FIG. 6, carriers 62 excited in the incident region are moved by the external electric field, and are trapped at interfaces between the crystal 11 and the insulating films 12 and 13 to be converted to spatial charges. Therefore, in the electrooptical crystal 11, the spatial charges serve as an internal electric field, and act to cancel the externally applied electric field. In this manner, the electric field in the electrooptical crystal 11 is determined in accordance with the light intensity in the electrooptical crystal 11. In this case, the electric field in the electrooptical crystal 11 becomes as follows.

A carrier density N ($cm^{-2} \cdot S^{-1}$) caused by optical pumping in the crystal is expressed as follows using quantum efficiency $\eta$, incident photon energy $h\nu$, a light intensity $I_c$ ($W \cdot cm^{-2}$) in the crystal and an absorption coefficient $\alpha$ ($cm^{-1}$):

$$N = \frac{\eta \cdot \alpha \cdot D}{h\nu} I_c \qquad (1)$$

The light incident on the electrooptical crystal 11 must be output as transmitted and/or reflected light in a sufficient amount in view of the object of the present invention. For this purpose, the thickness of the electrooptical element 11 must be smaller than a light absorption length. Thus, it is proper to consider that generated carriers are separated and trapped by the two surfaces of the electrooptical crystal 11 without a loss, and the carriers are distributed on only the surfaces.

A carrier density distribution at the interfaces between the electrooptical crystal 11 and the insulating films 12 and 13 when light is incident while applying a voltage $V_0$ to the entire nonlinear optical element as shown in FIG. 6 is given by:

$$\sigma_+ = \sigma_0, \quad \sigma_- = -\sigma_0$$

For $$\sigma 0 \, (c \cdot cm^{-2}) = e \int N dt \qquad (2)$$

e; unit charge (C)

As shown in FIG. 6, if potentials at three regions A, B, and C are represented by $\phi_a$, $\phi_b$, and $\phi_c$, respectively, they can be respectively given by:

$$\left. \begin{array}{l} \phi_a = A + A_0 Z \\ \phi_b = B + B_0(Z - d) \\ \phi_c = C + C_0(Z - d - D) \end{array} \right] \qquad (3)$$

Coefficients A, B, and C are the initial potentials of the respective layers, and coefficients $A_0$, $B_0$, and $C_0$ are the electric fields of the respective layers.

Since the above potentials are continuous, the following equations are established:

$$\left.\begin{array}{l}A = 0\\ A + A_o d = B\\ B + B_o D = C\\ C + C_o d = V_o\end{array}\right] \quad (4)$$

On the other hand, the following equations are obtained from a boundary condition of the electric field:

$$\left.\begin{array}{l}-\epsilon_b B_o + \epsilon_a A_o = \sigma_o\\ -\epsilon_a C_o + \epsilon_b B_o = -\sigma_o\end{array}\right] \quad (5)$$

By solving equations (4) and (5), the respective coefficients are determined.

A necessary value now is an electric field $B_0$ applied to the electrooptical crystal. If the electric field $B_0$ is represented by E, E can be expressed as follows from equations (4) and (5):

$$E = \frac{\epsilon_a V_o}{2\epsilon_b d + \epsilon_a D} - \frac{2\sigma_o d}{2\epsilon_b d + \epsilon_a D} \quad (6)$$

As described above from equations (1), (2), and (6), the electric field in the crystal can be obtained based on the external application voltage to the nonlinear optical element and the internal light intensity of the electro-optical crystal 11.

The behavior of the refractive index of the electrooptical crystal 11 upon application of the electric field will be described below.

The state of a change in refractive index is varied depending on the electrooptical crystal 11. In this case, a description will be given using BSO (point group 23), and GaAs and CdTe (point group $\bar{4}3m$) described in this example. All the crystals are optically isotropic crystals. Therefore, in a natural state, the crystals do not exhibit birefringence. However, upon application of an electric field, the crystals exhibit the birefringence.

Figure 7:
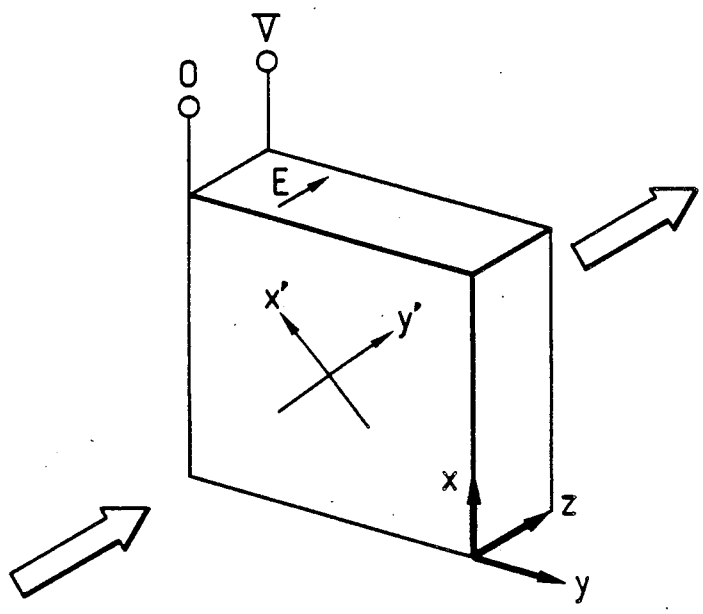

In this example, a so-called longitudinal type operation is performed wherein the propagation direction of light is the same as the electric field direction, as shown in FIG. 7. When an electric field is applied, new major axes appear at the positions of x' and y' axes obtained by rotating a coordinate system through $-45°$ with respect to original crystal axes x and y, as shown in FIG. 7. This coordinate system is called a major-axis coordinate system (x', y', z) upon application of the electric field. If a change in refractive index with respect to polarized light in the x'- and y'-axis directions is $\Delta n$, $\Delta n$ can be expressed using an electrooptical coefficient $\gamma_{41}$ by:

$$\Delta n = \tfrac{1}{2} n^3 \gamma_{41} E \quad (7)$$

where nd is the refractive index of the crystal in the natural state.

The process (b) will be explained below with reference to FIG. 4. In FIG. 4, assume that the intensity reflectance of the reflection mirror 12 on the light incident side is represented by $R_F$, the intensity reflectance of the reflection mirror 13 on the transmission side is represented by $R_B$, the incident light intensity is represented by $I_0$ (W·cm$^{-2}$), the transmitted light intensity is represented by $I_t$ (W·cm$^{-2}$), the reflected light intensity is represented by $I_r$ (W·cm$^{-2}$), the light intensity in the optical resonator is represented by $I_c$ (W·cm$^{-1}$), and the incident light wavelength is represented by $\lambda$ (nm).

In this case, from the resonance condition of a so-called Fabry-Pérot optical resonator as shown in FIG. 4, the following equation can be derived:

$$I_c = \frac{C \cdot I_o}{1 + F \sin^2 \theta} \quad (8)$$

From the feedback conditions at the transmission and reflection sides, $$I_t = A \cdot I_c \quad (9)$$

$$I_r = I_o - B \cdot I_c \quad (10)$$

For $$A = \frac{\alpha \cdot D(1 - R_B) \exp(-\alpha \cdot D)}{\{1 - \exp(-\alpha \cdot D)\}\{1 + R_B \cdot \exp(-\alpha \cdot D)\}} \quad (11)$$

$$B = \frac{\alpha \cdot D\{1 - R_B \cdot \exp(-2 \cdot \alpha \cdot D)\}}{\{1 - \exp(-\alpha \cdot D)\}\{1 + R_B \cdot \exp(-\alpha \cdot D)\}} \quad (12)$$

$$C = \frac{(1 - R_F)\{1 + R_B \cdot \exp(-\alpha \cdot D)\}\{1 - \exp(-\alpha \cdot D)\}}{\alpha \cdot D\{1 - \sqrt{R_F \cdot R_B} \exp(-\alpha \cdot D)\}^2} \quad (13)$$

$$F = \frac{4\sqrt{R_F \cdot R_B} \exp(-\alpha \cdot D)}{(1 - \sqrt{R_F \cdot R_B} \exp(-\alpha \cdot D))^2} \quad (14)$$

$$\theta = \frac{2\pi D}{\lambda} \Delta n + \delta_o \quad (15)$$

where $\delta_0$ is the phase difference in the resonator in the natural state, i.e., the initial phase amount.

Figure 8:
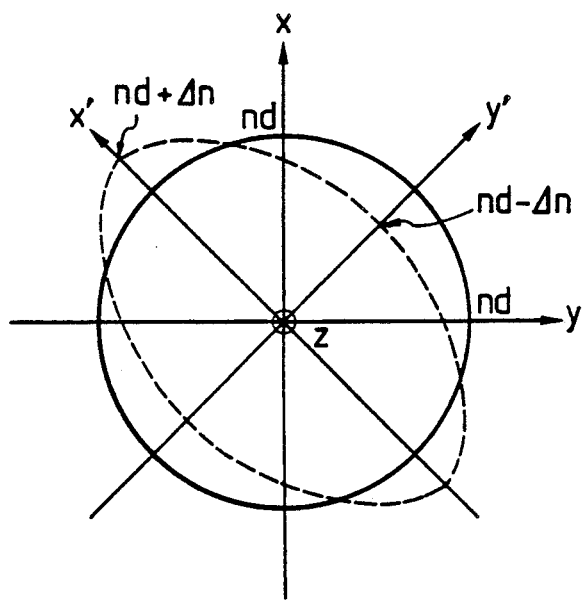

The relationship in equation (15) is established when incident light is linearly polarized light having a polarization plane along the x' axis in FIG. 8, and the refractive index changes from nd+$\Delta$n ($\sigma_0$=0) to nd upon a change in light intensity $I_c$ in the optical resonator. When the incident light has a polarization plane along the y' axis, since the refractive index changes from nd-$\Delta$n ($\sigma_0$=0) to nd, equation (15) is rewritten as:

$$\theta = -\frac{2\pi D}{\lambda} \Delta n + \delta_o \quad (15)'$$

Of course, for other polarized light components, a change in refractive index occurs within the range of nd$-\Delta$n to nd+$\Delta$n.

In order to obtain the relationship between the incident light intensity $I_0$ and the transmitted light intensity $I_t$, the internal light intensity $I_c$ is eliminated from equations (8) and (9), as follows.

$$A \cdot C \cdot I_o - I_t\{1 + F \sin^2 \theta(I_t)\} = 0 \quad (16)$$

Figure 9:
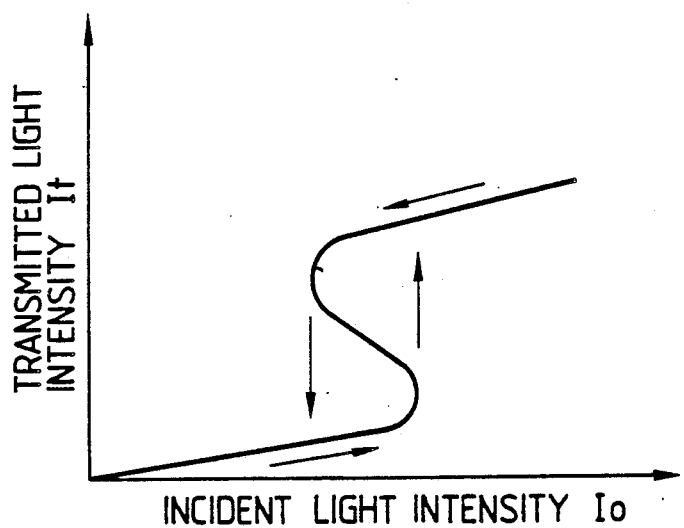
FIG. 9 is a graph for explaining input-transmitted light characteristics of the nonlinear optical element of the present invention.

By solving the transcendental equation of equation (16), incident-transmitted light intensity characteristics shown in FIG. 9 can be obtained. Predetermined differential gain characteristics or hysteresis characteristics can be obtained depending on setting of the parameters. In the hysteresis characteristics, a state having a negative inclination has an upward or downward stable state as indicated by arrows in FIG. 9, in practice.

Similarly, the incident-reflected light intensity characteristics can be obtained.

From equations (8) and (10), $$(I_o I_r)\{1 + F \sin^2 \theta(I_r)\} - B \cdot C \cdot I_o = 0 \quad (17)$$

Figure 10:
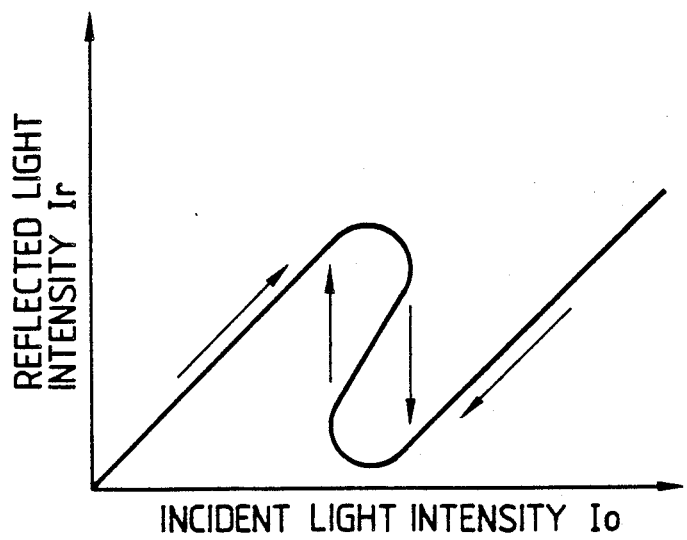
FIG. 10 is a graph for explaining input-reflected light characteristics of the nonlinear optical element of the present invention.

By similarly solving equation (17), incident-reflected light intensity characteristics shown in FIG. 10 can be obtained. Predetermined differential gain characteristics or hysteresis characteristics can be obtained depending on setting of the parameters.

A first embodiment of a method of forming a nonlinear optical element of the present invention will be described below. SiO$_2$ insulating films were formed by sputtering on two surfaces of a 500-μm thick BSO board having a crystal direction corresponding to the <100> plane. In this case, the film thickness of the SiO$_2$ film normally falls within the range of 1 to 10 μm and is set not to cause destruction and leakage due to an applied electric field and to be an integer multiple of λ/4 so as not to cause reflection at a boundary with the BSO.

An Ag film serving as an electrode was formed on the outer surface of each SiO$_2$ film. The Ag film on the light input side had a film thickness of 144 Å to have a reflectance $R_F$ of, e.g., 40%. On the other hand, the Ag film on the light transmission side had a film thickness of 290 Å to have a reflectance $R_B$ of, e.g., 70%. Thereafter, lead wires were welded to portions of the two surfaces of the Ag electrode surfaces, and a DC voltage of 5,000 V was applied across the Ag electrode surfaces. An Ar laser having a wavelength of 5,145 Å was employed as a light source, and its polarization direction was set in an axial direction rotated through −45° from the <100> direction. The pulse width of the laser beam was fixed to be 1 msec, the light intensity was gradually increased from 0, and the output light intensities of the transmitted and reflected light components were measured.

Figure 11:
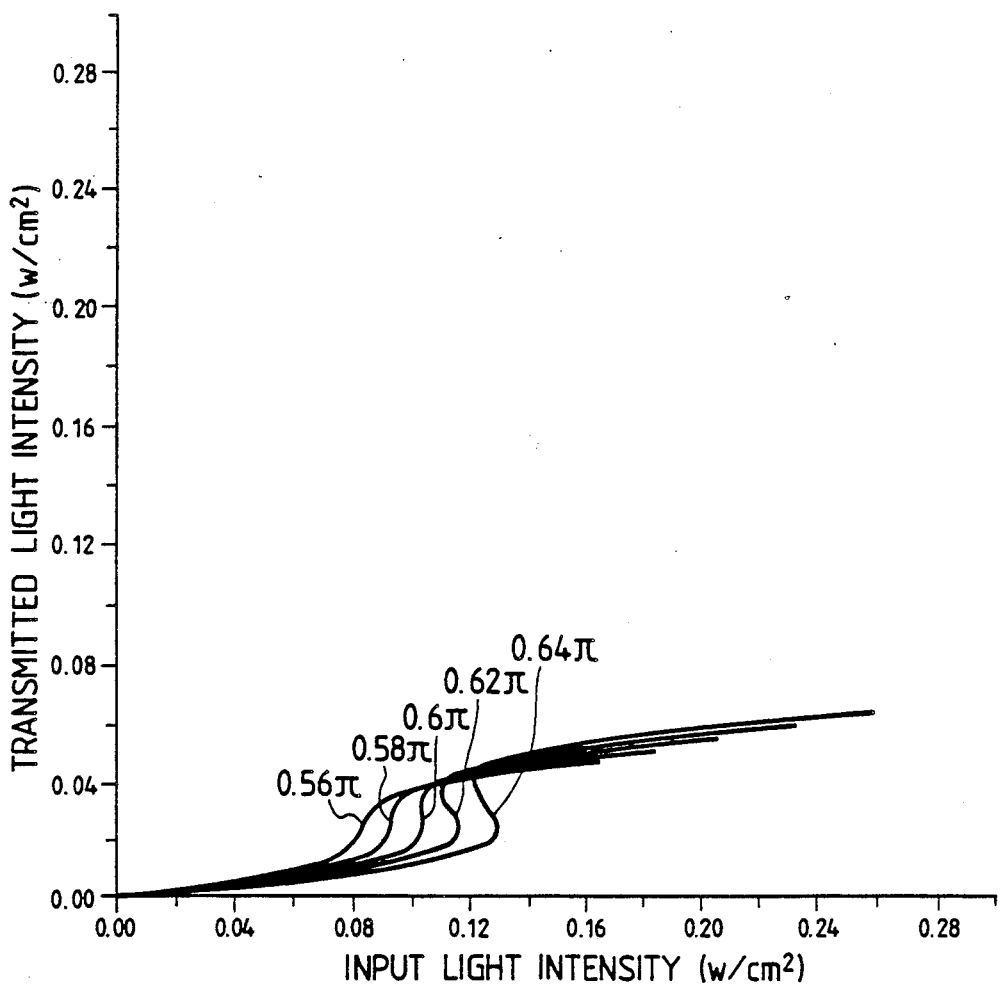
FIGS. 11 and 12 are graphs for explaining input/output characteristics of a first embodiment of a nonlinear optical element according to the present invention.
Figure 12:
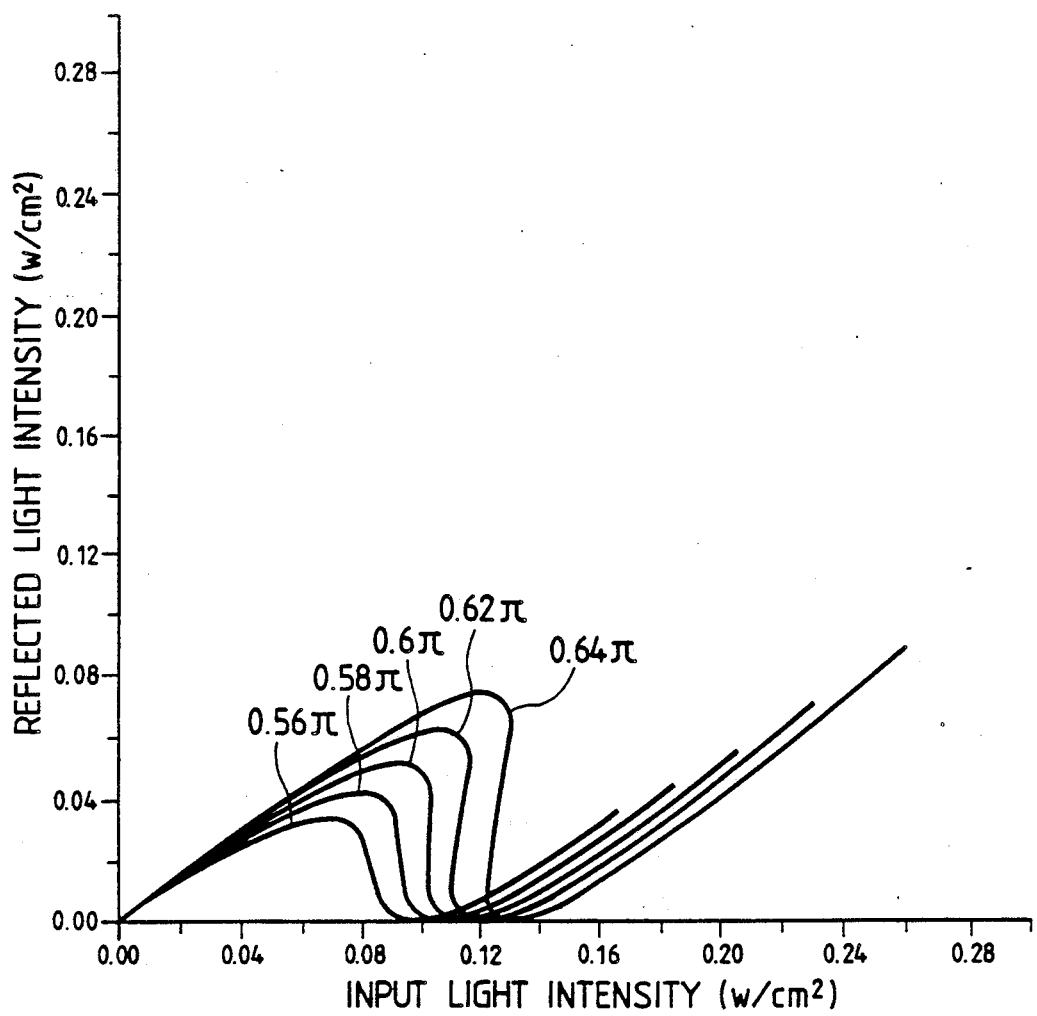

Contrary to this, the input light intensity was gradually decreased, and the transmitted and reflected light intensities were measured. FIGS. 11 and 12 show the measurement results. In FIGS. 11 and 12, a parameter is the initial phase amount, and represents a phase difference from the resonance state of the Fabry-Pérot resonator. As can be seen from FIGS. 11 and 12, the input/output light intensity characteristics exhibit differential gain characteristics or bistable characteristics depending on the setting of the initial phases.

Figure 13:
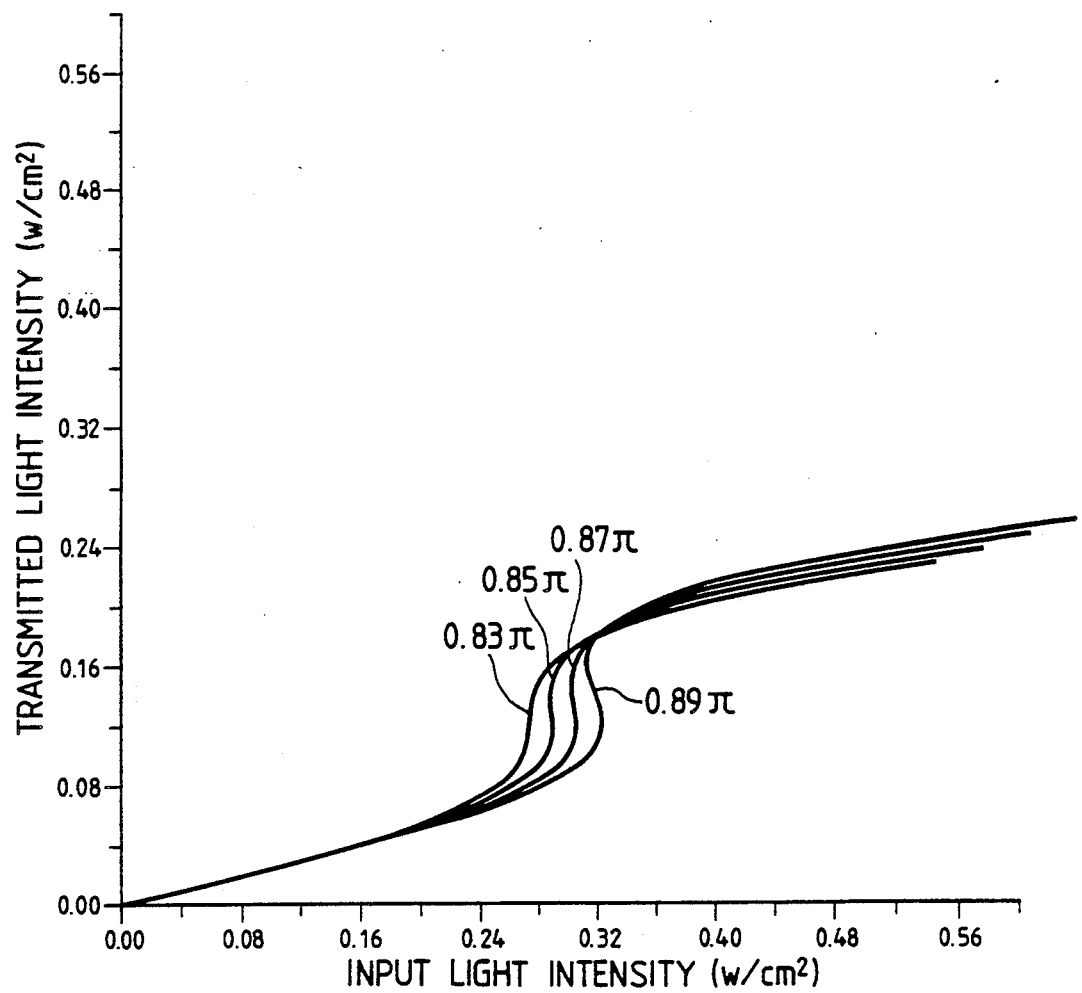
FIGS. 13 and 14 are graphs for explaining input/output characteristics of a second embodiment of a nonlinear optical element according to the present invention.
Figure 14:
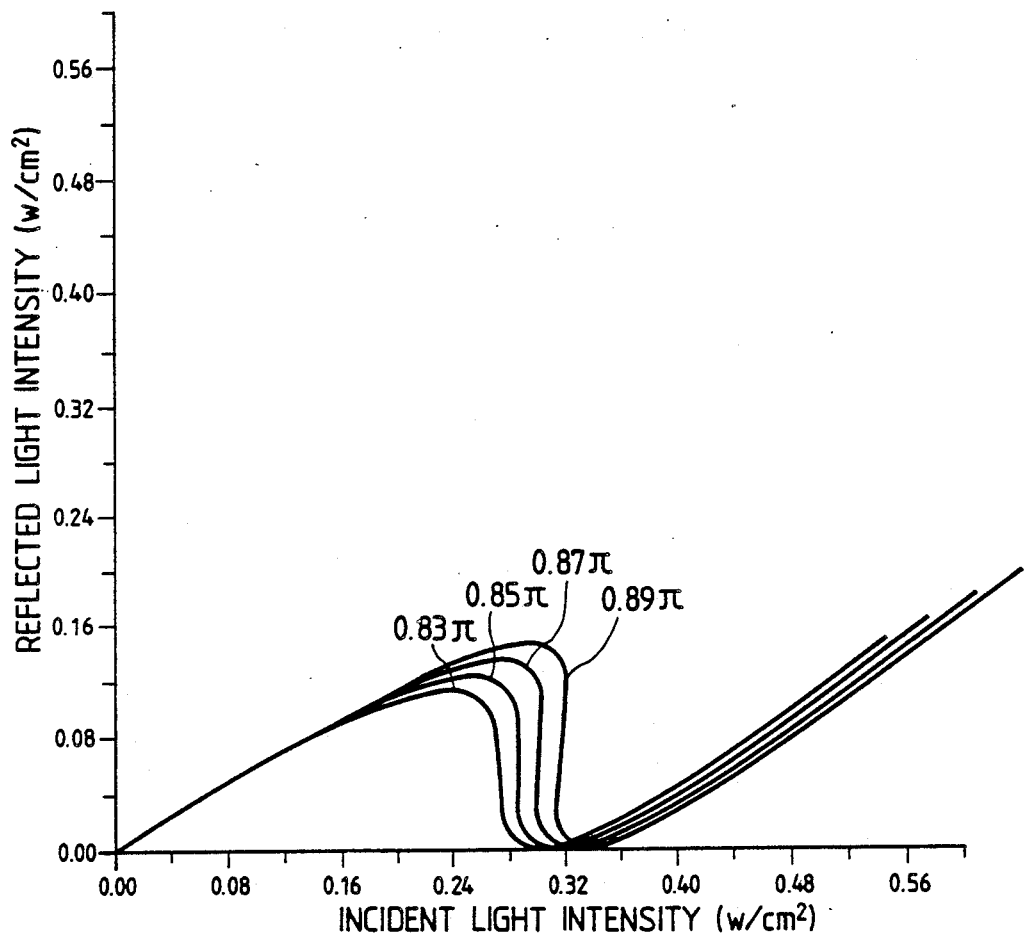

In a second embodiment, following the same procedures as in the first embodiment, reflection mirrors for a resonator were formed of Al films, and Al$_2$O$_3$ films were formed thereon, thus forming a nonlinear optical element which enhanced effects of antioxidation and increase of transmission. The reflectances of the reflection mirrors for the resonator were respectively $R_F$=20% (Al film thickness=40 Å) and $R_B$=40% (Al film thickness=100 Å), and other element formation conditions remained the same. FIGS. 13 and 14 show input/output characteristics (transmitted and reflected light intensities) when the initial phase amount is changed. Since the reflectances of the reflection mirrors are designed to be lower than those in the first embodiment, an operation threshold value is increased. However, since a light absorption amount is decreased, a light utilization factor is increased particularly at the transmission side.

In a third embodiment of the present invention, a GaAs crystal substrate having one surface polished to have a mirror surface was used, and a portion of its reflection surface was etched to form a mirror surface. An area having two mirror surfaces was about 5 mm × 5 mm, and its thickness was set to be about 300 μm.

Al$_2$O$_3$ films were formed on the two surfaces of the substrate by sputtering. The film thickness of each Al$_2$O$_3$ film was set to be an integer multiple of λ/4 so as to eliminate reflection as much as possible between the GaAs substrate and the Al$_2$O$_3$ film. Au films were deposited on the upper portions of the two surfaces to form reflection mirrors serving as electrodes. Lead wires were bonded to the Au electrodes, and a DC voltage of 3,000 V was applied thereto, thus forming an electrode. Note that a light source can be operated in response to near infrared light of 0.8 to 1.1 μm. By adjusting the reflectance of the reflection film and the initial phase amount of the resonator, nonlinear input/output characteristics were obtained as in the first and second embodiments.

Note that adjustment of the initial phase could be achieved by slightly controlling an incident angle of input light.

The operation principle of the above-mentioned nonlinear optical element is based on the photoconductive effect and the electrooptical effect. The nonlinear optical element comprises a nonlinear crystal, insulating films formed to sandwich the crystal therebetween, and metal electrode films. The metal electrode films also serve as reflection mirrors and form an optical resonator. This element utilizes a mechanism wherein when a high voltage is externally applied to the metal electrode films, an induced refractive index is produced in the nonlinear crystal and is then decreased according to an input light intensity.

With this structure, a nonlinear optical element which can be operated with respect to a sufficiently low input light intensity, has a high packing density and good operation stability, can be realized.

Since the reflection mirrors forming the optical resonator are formed of the metal films, an allowable range of an operation wavelength is widened. Since the reflection mirrors also serve as the electrodes, the entire structure can be simplified.

Figure 15:
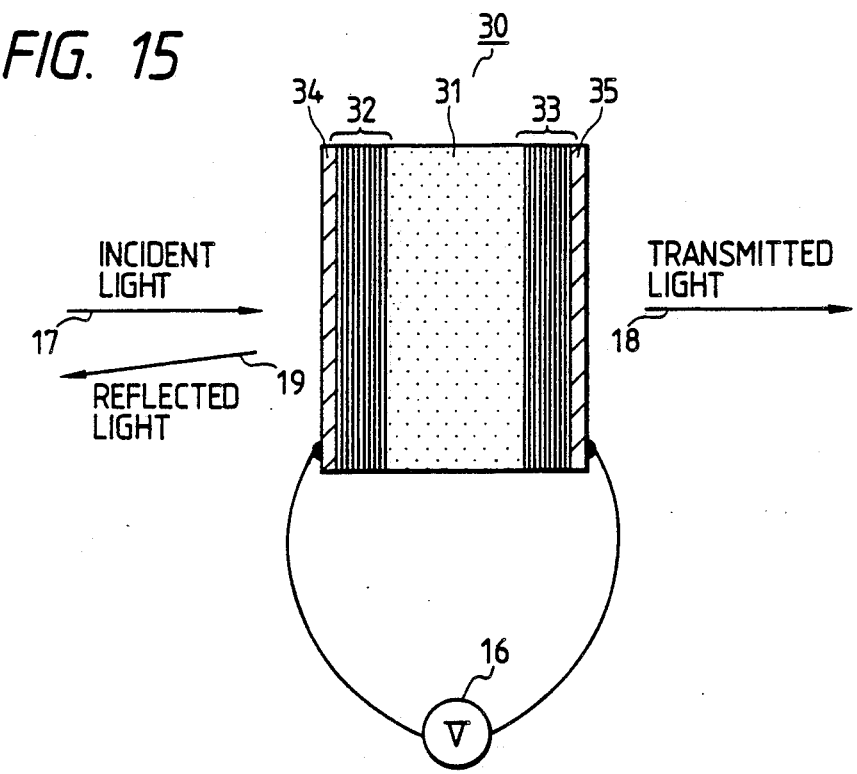
FIG. 15 is a schematic view showing another example of a nonlinear optical element of the present invention.

FIG. 15 is a schematic view showing another example of the nonlinear optical element of the present invention. In FIG. 15, a nonlinear optical element 30 comprises a nonlinear medium 31 having photoconductivity and an electrooptical effect, and reflection mirrors 32 and 33 of dielectric multilayered films which also serve as insulating films or include the insulating film, and form an optical resonator. The reflection mirrors 31 and 32 are arranged at two sides of the nonlinear medium 31. The element 30 also includes transparent electrodes 34 and 35, and an external power source 16.

In this example, the output intensities of transmitted light 18 and reflected light 19 cause differential gain characteristics or hysteresis characteristics with respect to the input intensity of incident light 17.

In this example, the same materials as in the example shown in FIG. 4 are used as the nonlinear medium 31. The reflection mirrors 32 and 33 are formed to serve as insulating films or to include the insulating film. The transparent electrodes 34 and 35 are formed on the outer side surfaces of the reflection mirrors 32 and 33.

Note that in this example, the reflectance, transmittance, light absorption coefficient, and the like are appropriately set for the entire structure including the transparent electrodes 34 and 35 and the reflection mirrors of the dielectric multilayered films.

Examples of the dielectric multilayered film include, e.g., $MgF_2$ (n=1.38), $SiO_2$ (n=1.46), $Al_2O_3$ (n=1.62), MgO (n=1.75), $ThO_2$ (n=1.8), SiO (n=1.7 to 2.0), $ZrO_2$ (n=2.1), $CeO_2$ (n=2.2), $TiO_2$ (n=2.2 to 2.7), and the like. Examples of the transparent electrode film are, e.g., $SnO_2$ (n=1.9), $In_2O_3$ (n=2.0), ITO (a synthesized material of $SnO_2$ and $In_2O_3$), and the like regardless of organic or inorganic materials.

The operation mechanism of the nonlinear optical element 30 according to this example will be described below. Note that the process (a) described above is the same as that in the example shown in FIG. 4, and a description thereof will be omitted. The process (b) will be described below with reference to FIG. 16.

Figure 16:
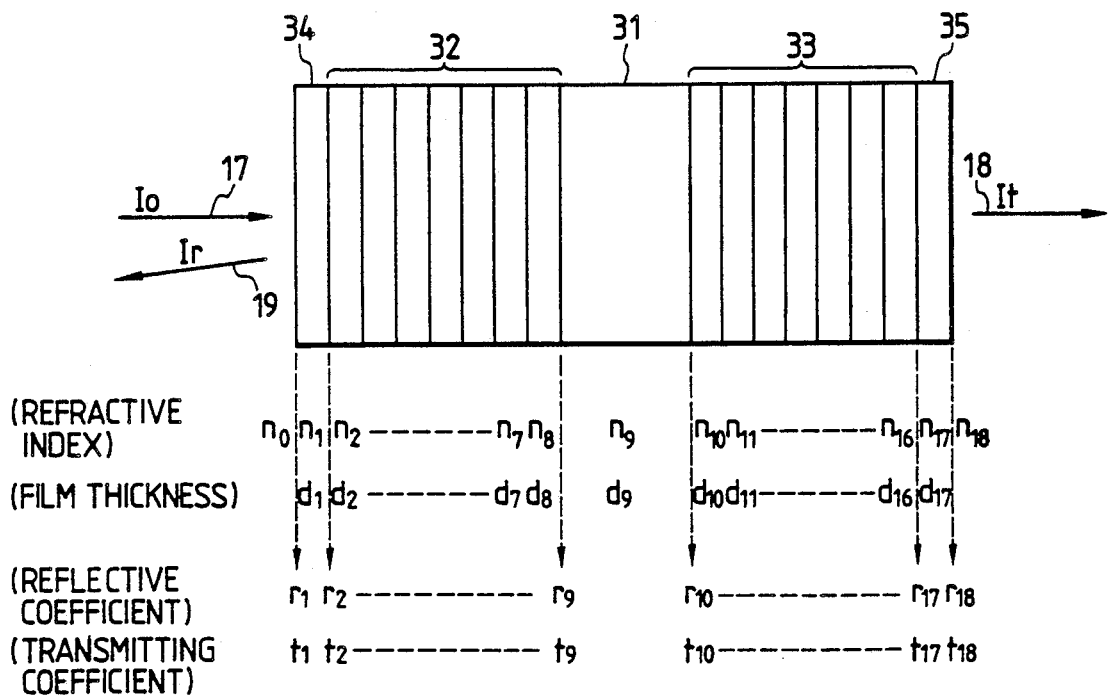
FIG. 16 is a view for explaining an operation analysis model of FIG. 15.

As shown in FIG. 16, the refractive indices of the layers constituting the reflection mirrors 32 and 33 are respectively represented by $n_0, n_1, n_2, \ldots$, and their film thicknesses are respectively represented by $d_1, d_2, \ldots$, (nm) from the incident light 17 side, the wavelength of the incident light is represented by $\lambda$ (nm), the incident light intensity is represented by $I_0$ (W·cm$^{-1}$), the transmitted light intensity is represented by $I_t$ (W·cm$^{-2}$), the reflected light intensity is represented by $I_r$ (W·cm$^{-2}$), and the internal light intensity in the nonlinear medium 31 is represented by $I_c$ (W·cm$^{-2}$). The reflective coefficients between adjacent layers are represented by $r_1, r_2, \ldots$, and transmitting coefficients are represented by $t_1, t_2, \ldots$.

The intensity transmittance and the intensity reflectance of a so-called Fabry-Pérot resonator having a structure shown in FIG. 16 are calculated using the above-mentioned parameters. According to a matrix method using a Fresnel coefficient, an amplitude reflectance R' and an amplitude transmittance T' of the entire nonlinear optical element can be expressed by:

$$R' = \frac{C_{21}}{C_{11}} \quad (18)$$

$$T' = \frac{t_1 \cdot t_2 \cdots t_{18}}{C_{11}} \quad (19)$$

where $C_{11}$ and $C_{21}$ are calculated as follows:

$$\begin{pmatrix} C_{11} C_{12} \\ C_{21} C_{22} \end{pmatrix} = \prod_{k=1}^{9} \begin{pmatrix} e^{ijk-1} & r_k e^{ijk-1} \\ r_k e^{-ijk-1} & e^{-ijk-1} \end{pmatrix} \times \quad (20)$$

$$\begin{pmatrix} e^{j9+ad9} & r_{10} e^{j9+ad9} \\ r_{10} e^{-j9-ad9} & e^{-j9-ad9} \end{pmatrix} \times$$

Electrooptical Crystal $$\prod_{K=11}^{18} \begin{pmatrix} e^{ijk-1} & r_k e^{ijk-1} \\ r_k e^{-ijk-1} & e^{-ijk-1} \end{pmatrix}$$

Transmission-side Multilayered Film Reflection Mirror where $j_k$ is the phase difference of each layer and is given by:

$$j_k = \frac{2\pi}{\lambda} n_k \cdot d_k \quad (21)$$

and $\alpha$ is the absorption coefficient of the electrooptical crystal.

Therefore, from equations (18) and (19), the intensity reflectance R and the intensity transmittance T are respectively expressed by:

$$R = \frac{I_r}{I_0} = \frac{C_{21}}{C_{11}} \left( \frac{C_{21}}{C_{11}} \right)^* \quad (22)$$

$$T = \frac{I_t}{I_0} = \frac{n_{18}}{n_0} \cdot \frac{(t_1 \cdot t_2 \cdots t_{18})^2}{C_{11} \cdot C_{11}^*} \quad (23)$$

Since the refractive index ($n_9$) of the electrooptical crystal included in $C_{11}$ and $C_{21}$ in equations (22) and (23) is changed in accordance with the internal light intensity $I_c$, as described in the process (a), it is expressed as a function of $I_c$. That is, $$n_9 = n_d + \Delta n(I_c) \quad (24)$$

From the transmission- and reflection-side feedback conditions, if the thickness $d_9$ of the nonlinear medium 31 shown in FIG. 15 is represented by D, the relationships between the internal light intensity $I_c$, and the reflected light intensity $I_r$ and the transmitted light intensity $I_t$ are respectively given by:

$$I_t = A \cdot I_c \quad (25)$$

$$I_r = I_0 - B \cdot I_c \quad (26)$$

For $$A = \frac{\alpha \cdot D(1 - R_B) \exp(-\alpha \cdot D)}{\{1 - \exp(-\alpha \cdot D)\}\{1 + R_B \cdot \exp(-\alpha \cdot D)\}} \quad (27)$$

$$B = \frac{\alpha \cdot D\{1 - R_B \cdot \exp(-2 \cdot \alpha \cdot D)\}}{\{1 - \exp(-\alpha \cdot D)\}\{1 + R_B \cdot \exp(-\alpha \cdot D)\}} \quad (28)$$

$R_B$ in equations (27) and (28) is the intensity reflectance of the transmission-side multilayered film reflection mirror, and is calculated as follows.

If the electric field coefficient is expressed as in equation (20), $$\begin{pmatrix} C_{11} C_{12} \\ C_{21} C_{22} \end{pmatrix} = \begin{pmatrix} 1 & r_{10} \\ r_{10} & 1 \end{pmatrix} \times \prod_{K=11}^{18} \begin{pmatrix} e^{ijk-1} & r_k e^{ijk-1} \\ r_k e^{-ijk-1} & e^{-ijk-1} \end{pmatrix} \quad (29)$$

Using the coefficient given by equation (29), $$R_B = \frac{C_{21}}{C_{11}} \cdot \left( \frac{C_{21}}{C_{11}} \right)^* \quad (30)$$

When the internal light intensity $I_c$ is eliminated from equations (23) and (25) and from equations (22) and (26), the relationship between the incident light intensity $I_0$ and the transmitted light intensity $I_t$ and the relationship between the incident light intensity $I_0$ and the reflected light intensity $I_r$ are respectively obtained. The obtained relationships are given by transcendental equations, and incident-transmitted light intensity characteristics shown in FIG. 9 can be obtained. Differential gain characteristics or hysteresis characteristics can be obtained depending on setting of the parameters. In the hysteresis characteristics, a state having a negative inclination has an upward or downward stable state as indicated by arrows in FIG. 9.

Similarly, incident-reflected light intensity characteristics shown in FIG. 10 can be obtained. A fourth embodiment of a method of forming a nonlinear optical element of the present invention will be described below.

$MgF_2/ZrO_2/MgF_2/ZrO_2/MgF_2/ZrO_2/MgF_2/ZrO_2$ multilayered films in the order starting from the position near BSO were formed on two surfaces of a 500-$\mu$m thick BSO board having a crystal direction corresponding to the <100> plane, and were used as reflection mirrors of dielectric multilayered films, thus forming a Fabry-Pérot type optical resonator to sandwich the BSO therebetween.

The film thickness of each multilayered film is designed so that an optical film thickness n.d is 1,080 Å in correspondence with the wavelength ($\lambda$=514.5 nm) of an Ar laser beam used in the operation of this element. The entire multilayered film also serves as an insulating film.

ITO films as transparent electrodes are formed on the outer surfaces of the multilayered films. Lead wires are bonded to portions of the ITO electrode films, and a DC voltage of 5,000 V was applied across the ITO electrodes. The polarization direction of the Ar laser beam was set in an axial direction rotated from the <100> direction through −45°, the light intensity was gradually increased from 0, and the output light intensities of the reflected and transmitted light components were measured.

Figure 17:
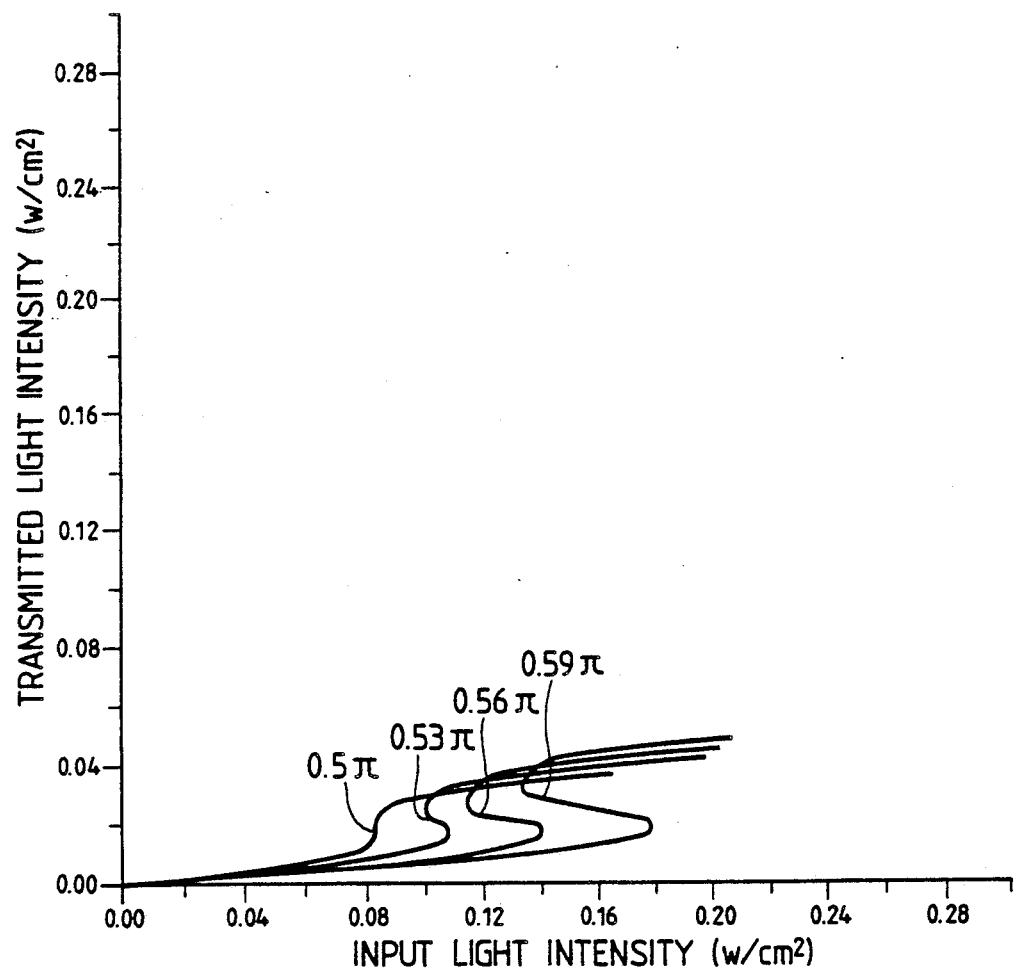

On the contrary, the input light intensity was gradually decreased, and the reflected and transmitted light intensities were measured. FIGS. 17 and 18 illustrate the measurement results in this case. In FIGS. 17 and 18, a parameter is the initial phase amount, and indicates a phase difference from the resonance state of the Fabry-Pérot resonator. As can be from FIGS. 17 and 18, the input/output light intensity characteristics exhibit differential gain characteristics or bistable characteristics depending on the setting of the initial phase.

In a fifth embodiment, the reflection mirrors of the dielectric multilayered films had different film structures on the incident and transmission sides. The film constituting materials were $ZrO_2$, $MgF_2$, and ITO and are the same as those in the above embodiment, but their film thicknesses were changed.

The incident-side film structure included $MgF_2$ (1,130 Å), $ZrO_2$ (745 Å), $MgF_2$ (1,130 Å), $ZrO_2$ (745 Å), $MgF_2$ (1,130 Å), $ZrO_2$ (745 Å), $MgF_2$ (1,130 Å), and ITO (745 Å) layers in the order starting from the BSO surface. The transmission-side film structure included $MgF_2$ (750 Å), $ZrO_2$ (495 Å), $MgF_2$ (750 Å), $ZrO_2$ (495 Å), $MgF_2$ (750 Å), $ZrO_2$ (495 Å), $MgF_2$ (750 Å), and ITO (495 Å) layers in the order starting from the BSO surface.

FIGS. 19 and 20 show input/output characteristics (transmitted and reflected light intensities) having the initial phase amount as a parameter. When the reflectances of the reflection mirrors constituting the resonator are selected, a nonlinear optical element having a larger nonlinear movement than that in the fourth embodiment can be obtained. By appropriately selecting the structures of the dielectric multilayered films, the initial phase amount, and the like, nonlinear optical elements having various input/output characteristics can be obtained.

In a sixth embodiment of the present invention, a GaAs crystal substrate having one surface polished to have a mirror surface was used, and a portion of its reflection surface was etched to form a mirror surface. An area having two mirror surfaces was about 5 mm×5 mm, and its thickness was set to be about 300 $\mu$m. A total of four $SiO_2$ and $TiO_2$ layers were alternately formed on each surface of the substrate, and an ITO film was formed on each outermost surface, thus forming an optical resonator. Lead wires were bonded to the ITO transparent electrodes, and a DC voltage of 3,000 V was applied, thus forming an element.

Note that a wavelength capable of performing an operation corresponds to near infrared light of 0.8 to 1.1 $\mu$m. By adjusting the film structures of the dielectric multilayered films and the initial phase amount of the optical resonator, the same nonlinear input/output characteristics as in the fourth and fifth embodiments could be obtained.

In the example shown in FIG. 15, since the reflection mirrors constituting the optical resonator were formed of the dielectric multilayered film, a nonlinear optical element which was free from an optical loss due to absorption and could simplify the entire structure since the mirrors also serve as insulating films, could be realized.

The present invention can be used in various other applications in addition to the above mentioned embodiments. The present invention includes all the applications within the spirit and scope of the appended claims.

What is claimed is:

1. A nonlinear optical element comprising:
   a nonlinear medium having photoconductivity and an electrooptical effect;
   a pair of electrodes, arranged on two side surfaces of said nonlinear medium, for applying an electric field to said medium, said electrodes serving as reflection mirrors forming an optical resonator;
   a pair of insulating layers formed between said nonlinear medium and said electrodes;
   means for supplying a predetermined DC voltage to said electrodes; and
   means for irradiating said medium with a light having a variable intensity,
   wherein a reflectance and a transmittance of said optical element are non-linearly varied in accordance with the intensity of the incident light.

2. An element according to claim 1, wherein said nonlinear medium is formed of a material selected from the group consisting of $Bi_{12}SiO_{20}$, $Bi_{12}TiO_{20}$, $Bi_{12}GeO_{20}$, $BaTiO_3$, $(Ba,Sr)Nb_2O_6$, GaAs, ZnSe, CdTe, and $LiNbO_3$.

3. An element according to claim 1, wherein each of said electrodes is formed of a material selected from the group consisting of Al, Ag, Au, and Cu.

4. An element according to claim 1, wherein each of said insulating layers is formed of $SiO_2$.

5. An element according to claim 1, further comprising films for effecting an antioxidation and increase of transmission, which are formed on a side surface of said electrodes opposite to said nonlinear medium.

6. An element according to claim 5, wherein each of said electrodes is formed of Al, and each of said films for effecting an antioxidation and increase of transmission is formed of $Al_2O_3$.

7. An element according to claim 1, further comprising a power source connected to said electrodes.

8. A nonlinear optical element comprising:

a nonlinear medium having photoconductivity and an electrooptical effect;

a pair of electrodes, arranged on two side surfaces of said nonlinear medium, for applying an electric field to said medium, said electrodes serving as reflection mirrors forming an optical resonator;

a pair of dielectric multilayered films formed between said nonlinear medium and said electrodes, said multilayered films serving as reflection mirrors forming an optical resonator;

means for supplying a predetermined DC voltage to said electrodes; and means for irradiating said medium with a light having a variable intensity;

wherein a reflectance and a transmittance of said optical element are non-linearly varied in accordance with the intensity of the incident light.

9. An element according to claim 8, wherein said electrodes are transparent.

10. An element according to claim 9, wherein each of said electrodes is formed of a material selected from the group consisting of $SnO_3$, $In_2O_3$, and ITO.

11. An element according to claim 8, wherein each of said multilayered films is formed of at least two materials selected from the group consisting of $MgF_2$, $SiO_2$, $Al_2O_3$, $MgO$, $ThO_2$, $SiO$, $ZrO_2$, $CeO_2$, and $TiO_2$.

12. An element according to claim 8, wherein said nonlinear medium is formed of a material selected from the group consisting of $Bi_{12}SiO_{20}$, $Bi_{12}TiO_{20}$, $Bi_{12}GeO_{20}$, $BaTiO_3$, $(Ba,Sr)Nb_2O_6$, $GaAs$, $ZnSe$, $CdTe$, and $LiNbO_3$.

13. An element according to claim 8, further comprising a power source connected to said electrodes.

14. A method for activating a nonlinear optical element comprising a nonlinear medium having photoconductivity and an electrooptical effect, a pair of electrodes arranged on two side surfaces of said nonlinear medium for applying an electric field to said medium, the electrodes serving as reflection mirrors forming an optical resonator, and a pair of insulating layers formed between said nonlinear medium and said electrodes, comprising the steps of:

supplying a predetermined DC voltage to said electrodes;

irradiating said medium with a light having a variable intensity; and non-linearly varying a reflectance and a transmittance of said optical element in accordance with the intensity of the incident light.

15. A method for activating a nonlinear optical element comprising a nonlinear medium having photoconductivity and an electrooptical effect, a pair of electrodes arranged on two side surfaces of said nonlinear medium for applying an electric field to said medium, and a pair of dielectric multilayered films formed between said nonlinear medium and said electrodes, said multilayered films serving as reflection mirrors forming an optical resonator, comprising the steps of:

supplying a predetermined DC voltage to said electrodes;

irradiating said medium with a light having a variable intensity; and non-linearly varying a reflectance and a transmittance of said optical element in accordance with the intensity of the incident light.

* * * * *

UNITED STATES PATENT AND TRADEMARK OFFICE
CERTIFICATE OF CORRECTION

PATENT NO. : 5,002,369
DATED : March 26, 1991
INVENTOR(S) : HAJIME SAKATA

It is certified that error appears in the above-indentified patent and that said Letters Patent is hereby corrected as shown below:

ON THE TITLE PAGE

AT [56] REFERENCES CITED

Attorney, Agent or Firm,
        "Fitzpatrick, Cella,, Harper & Scinto" should read
        --Fitzpatrick, Cella, Harper & Scinto--.

COLUMN 5

Line 56, "$\Delta n = \tfrac{1}{2} n^3 \gamma_{41} E$     (7)" should read
        --$\Delta n = \tfrac{1}{2} n d^3 \gamma_{41} E$     (7)--.

COLUMN 6

Line 1, "$I_c(W \cdot cm^{-1})$," should read --$I_o(W \cdot cm^{-2})$,--.

COLUMN 7

Line 3, "$(I_o I_r)\{1+F\sin^2\theta(I_r)\} - B \cdot C \cdot I_o = 0$     (17)"
        should read
        --$(I_o - I_r)\{1+F\sin^2\theta(I_r)\} - B \cdot C \cdot I_o = 0$     (17)--.
    Line 67, "have" should read --provide--.

UNITED STATES PATENT AND TRADEMARK OFFICE
CERTIFICATE OF CORRECTION

PATENT NO. : 5,002,369
DATED : March 26, 1991
INVENTOR(S) : HAJIME SAKATA

Page 2 of 3

It is certified that error appears in the above-identified patent and that said Letters Patent is hereby corrected as shown below:

COLUMN 9

Line 21, "$I_0(W \cdot cm^{-1})$," should read --$I_0(W \cdot cm^{-2})$,--.
EQ. 20, Equation 20 should read $$-- \begin{pmatrix} C_{11} & C_{12} \\ C_{21} & C_{22} \end{pmatrix} \cdot \overbrace{\prod_{k=1}^{9} \begin{pmatrix} e^{ij_{k-1}} & r_k e^{ij_{k-1}} \\ r_k e^{-ij_{k-1}} & e^{-ij_{k-1}} \end{pmatrix}}^{\text{Incident-side Multilayered Film Reflection Mirror}} --.$$

$$\times \underbrace{\begin{pmatrix} e^{ij_9 + \alpha d_9} & r_{10} e^{ij_9 + \alpha d_9} \\ r_{10} e^{-ij_9 - \alpha d_9} & e^{-ij_9 - \alpha d_9} \end{pmatrix}}_{\text{Electrooptical Crystal}}$$

$$\times \prod_{K=11}^{18} \begin{pmatrix} e^{ij_{k-1}} & r_k e^{ij_{k-1}} \\ r_k e^{-ij_{k-1}} & e^{-ij_{k-1}} \end{pmatrix} \quad -- (20)$$

COLUMN 10

EQ. 29, "$\pi$" should read --$\Pi$--.

UNITED STATES PATENT AND TRADEMARK OFFICE
CERTIFICATE OF CORRECTION

PATENT NO. : 5,002,369
DATED : March 26, 1991
INVENTOR(S) : HAJIME SAKATA

It is certified that error appears in the above-identified patent and that said Letters Patent is hereby corrected as shown below:

COLUMN 12

Line 28, "above mentioned" should read --above-mentioned--.

COLUMN 13

Line 29, "$Bi_{12}$, $SiO_{20}$," should read --$Bi_{12}SiO_{20}$,--.

Signed and Sealed this

Twenty-first Day of June, 1994

Attest:

BRUCE LEHMAN

*Attesting Officer*  *Commissioner of Patents and Trademarks*